United States Patent
Bucher

(10) Patent No.: US 9,316,491 B2
(45) Date of Patent: Apr. 19, 2016

(54) METHODS AND INSTRUMENTS TO MEASURE THE VOLUME SOLIDS OF A PAINT SAMPLE

(75) Inventor: Udo Wolfgang Bucher, Darlinghurst (AU)

(73) Assignee: Wolf Industrial Innovation (AU)

( * ) Notice: Subject to any disclaimer, the term of this patent is extended or adjusted under 35 U.S.C. 154(b) by 627 days.

(21) Appl. No.: 13/322,412

(22) PCT Filed: May 25, 2010

(86) PCT No.: PCT/AU2010/000630
§ 371 (c)(1),
(2), (4) Date: Dec. 15, 2011

(87) PCT Pub. No.: WO2010/135768
PCT Pub. Date: Dec. 2, 2010

(65) Prior Publication Data
US 2012/0123707 A1  May 17, 2012

Related U.S. Application Data

(60) Provisional application No. 61/254,929, filed on Oct. 26, 2009.

(30) Foreign Application Priority Data

| May 26, 2009 | (AU) | 2009902392 |
| Jun. 30, 2009 | (AU) | 2009903058 |
| Sep. 15, 2009 | (AU) | 2009904454 |
| Oct. 14, 2009 | (AU) | 2009904991 |
| Oct. 23, 2009 | (AU) | 2009905169 |
| Nov. 10, 2009 | (AU) | 2009905487 |

(51) Int. Cl.
*G01B 11/00* (2006.01)
*G01B 11/28* (2006.01)
(Continued)

(52) U.S. Cl.
CPC ............ *G01B 11/28* (2013.01); *B05C 11/1005* (2013.01); *G01B 11/0625* (2013.01); *B05C 1/0826* (2013.01)

(58) Field of Classification Search
CPC .. B05C 11/1005; B05C 1/0826; B05C 1/006; G01B 11/0625; G01B 11/28; G01B 11/02; G01B 11/026; G01B 11/03; G01B 11/0616; G01B 11/0683; G01B 11/0691; G01B 7/00; G01B 7/02; G01B 7/023; G01B 7/066; G01B 11/00; G01B 11/0666; B05D 2202/00; B05D 2203/35; B05D 11/28; B05D 11/286; B05D 7/14; B05D 7/536; B05D 7/532; B05D 7/572; B05D 7/576
USPC ................... 702/50, 55, 155, 156, 170, 172; 356/369, 503, 627, 628, 630
See application file for complete search history.

(56) References Cited

U.S. PATENT DOCUMENTS 4,092,165 A * 5/1978 Andrus et al. ................. 430/320
4,977,853 A * 12/1990 Falcoff et al. ................. 118/665
(Continued)

OTHER PUBLICATIONS

"Terahertz paintmeter for noncontact monitoring of thickness and drying progress in paint film", T. Yasui et al., Nov. 10, 2005, Applied Optics, vol. 44, No. 32, p. 6849-6856.*
(Continued)

*Primary Examiner* — Mischita Henson
(74) *Attorney, Agent, or Firm* — Barnes & Thornburg LLP

(57) ABSTRACT

An instrument for measuring volume solids of a paint sample is described.

19 Claims, 3 Drawing Sheets

(51) Int. Cl.
  *B05C 11/10* (2006.01)
  *G01B 11/06* (2006.01)
  *B05C 1/08* (2006.01)

(56) References Cited

U.S. PATENT DOCUMENTS

| | | | |
|---|---|---|---|
| 5,504,695 A * | 4/1996 | Yoshida et al. | 702/170 |
| 6,074,483 A * | 6/2000 | Belotserkovsky et al. | 118/665 |
| 6,128,081 A * | 10/2000 | White et al. | 356/503 |
| 6,437,864 B1 * | 8/2002 | Watanabe et al. | 356/399 |
| 6,818,062 B2 * | 11/2004 | Tomaru et al. | 118/123 |
| 2004/0212892 A1 * | 10/2004 | Tsujimoto | 359/599 |
| 2005/0046874 A1 * | 3/2005 | Caton et al. | 356/630 |
| 2008/0003420 A1 * | 1/2008 | Condon et al. | 428/216 |
| 2008/0107457 A1 * | 5/2008 | Katoh | 399/302 |
| 2009/0009863 A1 * | 1/2009 | Nakamura | 359/485 |

OTHER PUBLICATIONS

"Determining Volume Solids of Coatings", N. Whitehouse et al., Dec. 1998, JPCL, p. 13-15.*

Hansen et al., "How much does that can of paint really cost?", Jan. 5, 2006, http://www.plantservices.com/articles/2005/599.*

* cited by examiner

METHODS AND INSTRUMENTS TO MEASURE THE VOLUME SOLIDS OF A PAINT SAMPLE

CROSS-REFERENCE TO RELATED APPLICATIONS

This application is the U.S. national phase of PCT/AU2010/000630 filed May 25, 2010. PCT/AU2010/000630 claims the benefit under the Convention of Australian Patent Application Nos. 2009902392, 2009903058, 2009904454, 2009904991, 2009905169, 2009905487 and U.S. Provisional Patent Application No. 61/254,929 filed May 26, 2009, Jun. 30, 2009, Sep. 15, 2009, Oct. 14, 2009, Oct. 23, 2009, Nov. 10, 2009 and Oct. 26, 2009 (respectively). The entire disclosures of PCT/AU2010/000630, Australian Patent Application Nos. 2009902392, 2009903058, 2009904454, 2009904991, 2009905169, 2009905487 and U.S. Provisional Patent Application No. 61/254,929 are hereby incorporated by reference.

FIELD OF THE INVENTION

The invention relates to methods and instruments for measuring the volume solids of a paint sample. The invention also relates to methods and instruments for measuring the volume solids of a liquid suspension, a solution, or a reactive chemical coating sample. There are also provided methods for estimating the volume of paint sample required to coat a substrate.

BACKGROUND OF THE INVENTION

Paint and other liquid coatings are applied in the manufacture and finishing of a vast range of goods and products including metal sheet and coil, timber flooring, automobiles, aeroplanes, fencing, glass, packaging and the like. In the area of metal sheet and coil, the substrate is typically galvanized steel, aluminium, stainless steel, or zinc alloy coated steels including aluminium-zinc and zinc-magnesium coated steels.

Methods are available to measure the paint weight solids to ensure the quality of paint used in coating processes. However, the measurement of paint weight solids does not provide a precise measure of the cover that can be expected for a given volume of paint at a specified paint thickness. This is because two different coatings with the same value for paint weight solids are likely to have different average densities. The constituents of coatings include solvents, diluents, extenders, pigments, fillers, resins, flattening agents and so on, each component having specific gravity values. For this reasons the two coatings with the same value for paint weight solids are likely to have different values for paint volume solids. A value for paint weight solids is needed to estimate the cover that can be expected from the particular paint. Methods are also known for the measurement of paint volume solids. However, such methods and associated apparatus are relatively slow, inefficient, and inaccurate.

Apparatus and mathematical models are available to estimate the wet paint thickness that is applied to an industrial paint sample apparatus such as a roll coater, or to a moving metal sheet coil substrate (for example, during coil paint sample), or to substrates such as pre-made flooring and a myriad of other substrates. Without knowledge of the paint volume solids of the paint being used the thickness of the paint sample when dry cannot be accurately predicted.

The paint volume solids content property of liquid paints is the percentage of the wet paint that forms a solid paint sample; the balance being solvent(s) and/or diluents that evaporate during the drying phase of the paint sample process. For example, paint with volume solids of 50% will essentially cover twice as much area as a paint sample with 25% volume solids for the same paint sample thickness. The property of paint volume solids has particular application in an industry involving large scale application of paint. Improved methods for measuring paint volume solids would benefit coil coating, paint manufacturing, printing and automotive finishing, and other finishing or paint sample processes.

References to paint in the patent specification should be extended, in meaning, to cover or include inks, liquid suspensions, solutions, or inert, and reactive chemical coatings.

SUMMARY OF THE INVENTION

In one aspect of the invention there is provided an instrument for measuring volume solids of a paint sample, comprising:

sensor means arranged to emit and detect signals reflected from the surface of the paint sample on a substrate, for generating data sets consisting of data indicative of the position of the surface of the same paint sample when wet and when dry and the position of at least one reference surface, the sensor means being located so as to be distanced from the paint sample for the emission and detection of the signals; and processing means for processing the data sets generated by the sensor means to determine the volume solids of the paint sample.

In an aspect of the invention there is provided an instrument wherein the position of at least the surface of the paint sample when wet and when dry is measured with relative movement between the sensor means and the paint sample, the relative movement is effectively carried out by a traversing stage to scan the paint sample.

In at least some embodiments of the invention there is provided an instrument wherein the traversing stage does not impart movement of greater than 10 micrometers to the paint sample in a direction that is perpendicular to the direction of travel, such movement being typical of vibration.

In at least some embodiments of the invention there is provided an instrument adapted to scan the wet paint sample more than once, and to scan the dry paint sample more than once to generate multiple data sets from the sensor means for the purpose of measuring paint volume solids of a paint sample.

In at least some embodiments of the invention there is provided an instrument wherein the reference surface is the surface of the substrate on which the paint sample is placed.

In at least some embodiments of the invention there is provided an instrument wherein the scan of the substrate and the scan of the paint surface are along a line, and the scan line of the wet paint sample is in the same position as the scan line of the dry paint sample.

In at least some embodiments of the invention there is provided an instrument wherein the same reference surface is utilised when scanning the wet paint sample and the dry paint sample, and the scan speed is substantially the same during scanning of the wet paint sample and the scan of the dry paint sample.

In at least some embodiments of the invention there is provided an instrument including a spreading means for spreading the paint sample on a surface of the substrate, the sensor means being arranged to detect signals reflected from the surface of the paint sample after spreading for the generation of the data sets.

In at least some embodiments of the invention there is provided an instrument in which the spreading means is one of a doctor blade and a wire wound draw down bar, and the spreading means is adopted to reduce the thickness of the wet paint sample to an average value of between 10 micrometers and 350 micrometers.

In at least some embodiments of the invention there is provided an instrument in which the spreading means is adopted to reduce the thickness of the wet paint sample to an average value of between 20 micrometers and 80 micrometers.

In at least some embodiments of the invention there is provided an instrument in which the spreading means is adopted to spread the wet paint sample to a width of between 1 mm and 30 mm.

In at least some embodiments of the invention there is provided an instrument including drying means for effecting drying of the wet paint sample after measurement of the position of the surface of the wet paint sample wherein the drying means is controlled to heat the substrate and the paint sample to a peak surface temperature value with an accuracy of plus or minus 4 degrees C. (Celsius) from a desired reference temperature.

In at least some embodiments of the invention there is provided an instrument with a cooling means, typically a fan, to cool the substrate after drying to a selected temperature, the selected temperature being in the range 20 degrees C. to 120 degrees C., and optionally compensating for thermal expansion of the dried paint sample when measuring the position of the surface of the dry paint sample.

In at least some embodiments of the invention there is provided an instrument wherein the sensor means is a laser displacement sensor for measuring the distance to at least one of the surface of the paint sample and the reference surface.

In at least some embodiments of the invention there is provided an instrument wherein the data forming respective of the data sets comprises data indicating average positions of at least the surface of the paint sample when wet and when dry.

In at least some embodiments of the invention there is provided an instrument wherein the data forming respective of the data sets comprises data indicating average cross sectional area of the paint sample when wet and when dry.

In at least some embodiments of the invention there is provided an instrument wherein the data forming respective of the data sets comprises data indicating average volume of the paint sample when wet and when dry.

In at least some embodiments of the invention there is provided an instrument comprising processing means wherein a computer with software derives values from the data sets corresponding to the position of the reference surface in order to determine one of the average thickness of the paint sample or the cross-sectional area of the paint sample prior to determining the paint volume solids of the paint sample.

In at least some embodiments of the invention there is provided an instrument including a disposable substrate for the paint sample wherein the substrate is selected from the group consisting of a coated glass slide and a flat strip of metal.

In at least some embodiments of the invention there is provided an instrument wherein one surface of the substrate along the scan line does not deviate more than 40 micrometers from a flat plane.

In at least some embodiments of the invention there is provided an instrument for measuring the volume solids of a sample selected from the group consisting of a sample of paint, lacquer, varnish, ink, aqueous slurry, a high build paint sample, and an inorganic chemical suspension or solution.

In at least some embodiments of the invention the instrument has a paint volume solids measurement cycle for a paint sample of less than 4 minutes.

In at least some embodiments of the invention there is provided an instrument wherein initiation of the paint volume analysis cycle occurs with the press of no more than two buttons. The second button may be depressed simultaneously with the first button for safety reasons so that the operator cannot place their hand near the sample during cycle initiation, alternatively the second button may be used to initiate the software to prepare for an analysis cycle, and in that case the button will be a click on a computer screen.

In an aspect of the invention there is provided an instrument adapted to measure the paint volume solids of a paint sample and to calculate the total volume of paint required to paint a given area of a product at a specified paint thickness using the measured value of paint volume solids.

In an aspect of the invention there is provided a method for measuring volume solids of a paint sample, comprising:

providing sensor means to emit and detect signals reflected from the surface of a paint sample on a substrate, for generating data sets consisting of data indicative of the position of the surface of the paint sample when wet and when dry and the position of at least one reference surface;

generating the data sets using the sensor means, the sensor means being distanced from the paint sample to emit and detect the signals; and processing the data sets to determine the volume solids of the paint sample.

In an aspect of the invention there is provided an instrument for measuring volume solids of a paint sample, comprising:

sensor means arranged to emit and detect signals reflected from the surface of the paint sample on a substrate, for generating data sets consisting of data indicative of the position of the surface of the paint sample when wet and when dry and the position of at least one reference surface, the sensor means being located so as to be distanced from the paint sample for the emission and detection of the signals; and processing means for processing the data sets generated by the sensor means to determine the volume solids of the paint sample.

In another aspect of the invention there is provided a method for measuring volume solids of a paint sample, comprising:

providing sensor means to emit and detect signals reflected from the surface of the paint sample on a substrate, for generating data sets consisting of data indicative of the position of the surface of the paint sample when wet and when dry and the position of at least one reference surface, generating the data sets using the sensor means, the sensor means being distanced from the paint sample to emit and detect the signals; and processing the data sets to determine the volume solids of the paint sample.

Typically, an instrument embodied by the invention further comprises drying means for effecting drying of the wet paint sample.

Typically, at least the position of the surface of the paint sample when wet and/or dry is measured with relative movement between the sensor means and the paint sample. In at least some embodiments, the position of the reference surface is also measured with relative movement of the sensor means.

In at least some embodiments the same reference surface is measured when measuring the surface of the wet and the dry paint sample.

In at least some embodiments the same portion of the paint surface is measured in the wet and the dry state.

The volume solids of the paint sample can be used to evaluate the cover that may be achieved for a paint sample on a given substrate. Moreover, the determination of the volume solids of the wet paint sample has application in determining the final thickness of the dried paint sample when the paint sample is applied to a product substrate such as during a production run, and can be used to control the thickness of the wet paint sample applied to the substrate during the paint sample process.

The signals emitted and sensed by the sensor means in at least some embodiments of the invention are electromagnetic radiation signals, and can be of any wavelength deemed suitable. Moreover, the signal emitted by the sensor means may be in the form of a beam, and can be a continuous or pulsed signal. It will be understood that the term "signal" is to be taken in the sense of the emission of energy or radiation by the sensor means for being detected upon being reflected from at least the surface of the paint sample and can, for example, be a laser signal.

Typically, the sensor means utilised in an instrument and method of the invention comprises or consists of at least one displacement sensor for measuring the distance to at least one of the surface of the paint sample when wet and/or dry and the reference surface. Typically, a single displacement sensor is used.

The data forming the respective data sets may comprise discrete measurements of the position of the surface of the paint sample and the reference surface, and/or an average position of one or both of those surfaces.

It will be understood the reference surface in methods described herein can be any surface deemed suitable. In an embodiment, data indicative of the position of a plurality of different reference surfaces can be obtained and a single reference surface plane or position calculated from that data. Typically, the reference surface is that surface of the substrate on which the paint sample is placed for determination of the volume solids of the paint sample.

The difference between the position of the surface of the paint sample when dried compared to when the paint sample is wet indicates the amount of non-solids (e.g., solvent, diluents) that were present in the paint sample. The remaining thickness of the paint sample is thereby due essentially entirely to the volume of solids in the paint sample, and can be readily determined/calculated such as by determining the percentage thickness of the dried paint sample relative to the thickness of the wet paint sample. In particular, wet thickness measurements of the paint sample can be converted to a value that represents the wet paint sample volume, dry paint sample thickness measurements can be converted to a value representative of the dry paint sample volume, and the volume solids of the paint sample can be calculated by dividing the value for the dry paint sample volume by the value for the wet paint sample volume. The determined volume solids value is typically a value representative of the cross-sectional area of the paint sample along a line of measurement of the paint sample.

Hence, the "volume solids" of the paint sample can be calculated as the volume of the solids present in the paint sample when wet, divided by the overall volume of the paint sample when wet (i.e., the volume of both the solids and the non-solid component(s) such as solvent(s). The volume solids of a paint sample is typically, though not necessarily, expressed as a percentage value of the wet paint sample.

The paint sample for which the volume solids is determined can be any paint sample that is amenable to determination of its thickness by an instrument and method embodied by the invention, and may be selected from a sample of paint, lacquer, varnish, an aqueous slurry, a polymeric paint sample, or an inorganic chemical paint sample.

Advantageously, the thickness of the wet paint sample applied to the substrate of a product such as steel strip can be adjusted during a production run to reduce variation in the thickness of the paint sample when dry and/or to maintain the thickness of the dry paint sample substantially constant or within a predetermined thickness range with knowledge of the volume solids of the paint sample. This can provide a significant reduction in the overall volume of the particular paint sample applied with the potential for corresponding production cost and energy savings. Moreover, by estimating or calculating the expected dry thickness of the paint sample based on volume solids data prior to the application of the paint sample to the product substrate in a paint sample production run as provided for by at least some embodiments of the invention, wastage of the product substrate itself can be reduced through the application of the required paint sample thickness to the substrate essentially at the commencement of the production run.

The features and advantages of the invention will become further apparent from the following detailed description of exemplary embodiments of the invention and the accompanying drawings.

BRIEF DESCRIPTION OF THE ACCOMPANYING DRAWINGS

DETAILED DESCRIPTION OF EXEMPLARY EMBODIMENTS OF THE INVENTION

Figure 1:
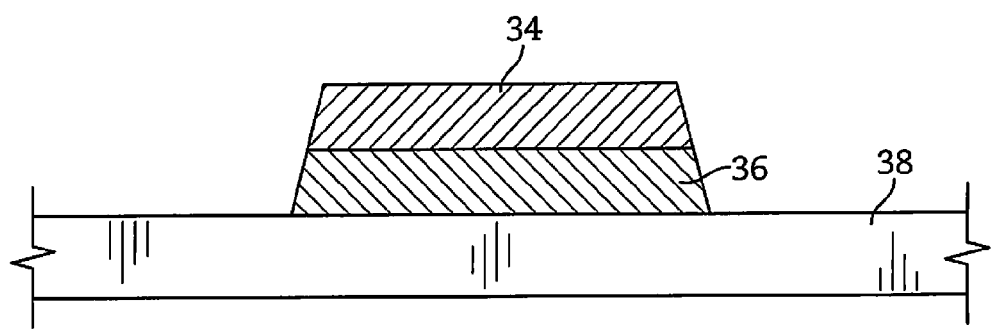
FIG. 1 is a schematic diagram illustrating the cross-sectional profile of a wet paint film relative to the cross-sectional profile of the paint film when dry.

In FIG. 1 there is shown a schematic diagram illustrating a cross section of a wet paint film (34) and the cross section of the film when dried (36) following the evaporation of the solvent(s), diluents, and any other liquids and non-solids from the paint to a predetermined level of dryness of the paint. While in this embodiment, the volume solids of paint is determined it will be understood the invention is not limited thereto and the invention extends to the measurement of the volume solids of other liquids including aqueous slurries, suspensions, inorganic coatings and the like. The invention typically, but not exclusively, applies to the measurement of liquids to be used for coating.

The wet paint film is produced by placing a controlled volume of paint onto a suitable substrate (38) such as a glass slide to provide a sample of the paint. In other embodiments, a short length of a flat, stiff metal sheet can be used as the substrate. The metal sheet can be a sample of the same material to be coated with the paint in a production run for the manufacture of a painted product. Generally, the wet paint is smoothed along the substrate with spreading means in the form of a small doctor blade, mini draw down bar or other means to coat a small area of the substrate (generally less than 20 mm across). The spreading of the paint can be achieved manually or as part of an automated process. The resulting wet film so created will generally have a wet film thickness within predetermined tolerance(s). Most usually, the wet film has an average width to thickness ratio, as measured at the line across which the paint sample is scanned, of greater than 5 or 10 and most usually, greater than 50. If the wet paint film is too thick it may blister during drying resulting in a false reading. Typical thicknesses are less than 350 micrometers and more typically less than 250 micrometers.

To measure the volume solids of the paint, the coated slide or other substrate is placed on a traversing stage (not shown) which moves the slide along a liner path through the beam of sensor means in the form of a displacement sensor to generate data indicating the position of the surface of the wet paint film relative to the sensor (e.g., the distance to the surface of the wet paint from the paint sample). The wet paint film is then heated to a predetermined set temperature for a predetermined period sufficient for the paint film to cure/dry. Optionally, the dry paint film is cooled by a fan to a second predetermined temperature, desirably ambient temperature. The slide is then passed back through the beam of the displacement sensor along the same linear path, and data indicating the position of the surface of the dried paint film is generated.

The reference surface (e.g., taken as the "baseline" or "zero value") with respect to which the thickness of the wet (or dry) paint film is determined can be a predetermined plane. That is, the scan/measurements made by the displacement sensor can commence from an initial position on the slide with no paint film, continue across the paint film to obtain measurements of the position of the surface of the smoothed wet film, and finish at an end position on the slide that is again paint film free. The position of the surface of the substrate can be measured at the starting and/or end positions on the substrate. The data set so obtained is then processed by processing means in accordance with the invention to determine the thickness of the dried paint sample film relative to the thickness of the film when wet, allowing the volume solids of the wet film to be determined.

More particularly, the data generated can be processed to calculate the relative thickness or the cross-sectional profile or area of the respective wet and dry paint film and their relative positions, and the ratio of the thickness or the cross-sectional area of the dry paint film relative to that of the wet paint film determined to obtain a value for the volume solids of the paint. As will be understood, the processing of the data set can involve integrating the data to determine the cross sectional area of the paint film along the scan line when wet and when dry; and then dividing the dry cross sectional area by the wet cross sectional area to arrive at the volume solids of the wet paint. In calculating the cross sectional area of the paint, the reference surfaces of the substrate on either side of the paint sample can be projected under the paint sample to estimate the actual position of the surface of the substrate under the paint sample. As will be understood, the thickness of the wet and dry paint samples can be determined at a plurality of locations along the scan line and average values of each of these thicknesses determined for calculation of the volume solids of the paint. As an alternative, parallel reference planes respectively corresponding to the position of the surface of the paint sample when wet and when dry and to the position of the surface of the substrate can be determined. To calculate the volume solids of the paint, the volumes of the wet and dry layers of the paint can then be determined for a given length of the substrate and the resulting values used. Hence, there are a variety of ways data generated by the displacement sensor can be utilised for determination of the volume solids and all such ways are encompassed by the invention.

While the position of the surface of the substrate on which the sample of paint is provided can be measured with data generated by the sensor means, this is not necessary in some embodiments of the invention. For example, with a substrate of known thickness, the position of the surface of the substrate relative to the displacement sensor is also known and this position can be preset in an instrument embodied by the invention as the reference base-line or zero value. The thickness of the wet and dry paint samples of the paint sample can then be calculated for determination of the volume solids value of the paint utilising data generated by the displacement sensor indicative of the position of the surfaces of the paint when wet and when dry.

A correction factor can be applied in the processing of the data in an embodiment of the invention to compensate for variables such as the respective temperatures at which the wet and dry paint films are scanned, instrument set-up and the like. Correction factors can be predetermined for a range of different paint samples, temperatures and drying processes/profiles, and the correction factor for the particular paint sample and drying profile utilised selected from this data.

Data filtering or data recognition can be utilized to exclude data that appears erroneous or is outside preset limits. As will be understood, while some data may be excluded there is nevertheless sufficient data capture for determination of the paint sample thickness. Generally, the data utilized in the calculation of the position of the surface of the wet and dried paint sample, and the position of the surface of the substrate (when employed) in a method embodied by the invention are average values for a given length and/or width of the substrate. The use of averaged data enhances the resilience and integrity of the data.

The determination of the volume solids of the paint sample can be determined by an automated process/instrument. For example, the sample of the wet paint or other paint sample can be placed on a glass slide or other substrate, and the substrate inserted into a measurement instrument embodied by the invention which conducts all stages of the measurement in an automated stepwise manner once the operator activates the process such as by pushing a start button of the instrument. Typically, the scanning of the wet and dried paint samples is achieved over a period of about 1.5 seconds, respectively. Data indicative of the position of the surface of the substrate can also be determined during one or both of these scans by sensing the reflection of the signal (e.g., a laser or other electromagnetic beam which may be continuous or pulsed) emitted by the displacement sensor from the substrate.

The drying of the wet paint film is dependent on the drying cycle (e.g., temperature and drying period) and the drying method employed (e.g., near infra-red radiation (IR) medium IR, induction heating, catalyst driven, convection or forced convection heating and the like). For instance, the drying of the paint sample may be affected by its cross-sectional thickness (e.g., a paint sample film with a thickness of $300\,\mu M$ may lose solvent during the drying process in a manner that is different to a film of the same paint sample that has a thickness of $150\,\mu M$ due to solvent migration differences and, for example, surface "skinning" differences). Typically, the wet paint sample is smoothed by a doctor blade or other spreading means to a wet thickness in a range of from 20 to 80 micrometers.

A range of different drying profiles can be stored in an instrument embodied by the invention for the operator to select the particular drying profile for the specific paint sample. Alternatively, the selected drying profile can be manually set for automatic operation of the instrument. The paint samples drying cycle or the paint samples time-temperature profile can be readily programmed and controlled by a temperature controller coupled to a thermocouple or an infra red pyrometer that monitors the oven or the sample temperature during paint drying. Other means of controlling the drying cycle include controlling the heating element and the oven temperature. Temperature control means are well known in the art.

The temperature for drying of the paint sample in an instrument of the invention can be monitored by temperature sensor means such as a thermocouple or suitable pyrometer. Exergen corporation provide a suitable non contact pyrometer for this purpose such as the micro IR/tc. Temperature controllers are supplied by many corporations including Eurotherm, Panasonic, and the like, and a suitable controller would be the Eurotherm 2132. In addition the drying profile can be controlled by control means in the form of a temperature controlled element and a timer for controlling the length of the period to which the paint sample is subjected to drying in the instrument. An instrument embodied by the invention can incorporate any suitable drying means for effecting drying of the wet paint sample such as electrical heating element(s), an infra red source, or other conventional drying system. The temperature and predetermined drying period can be displayed on an instrument embodied by the invention as can be the drying profile selected. As will be understood, the term "drying" in the context of embodiments of the invention is to be taken to encompass curing and setting of the paint sample.

An instrument embodied by the invention can include a housing. The traversing stage can be configured for lengthwise and/or transverse movement of the substrate relative to the beam emitted by the displacement sensor. The stage may also be used to move the sensor while the sample is held stationary. The displacement sensor can be provided in a fixed position in the instrument for emission of an electromagnetic signal onto the surface of the paint sample and substrate as applicable. The housing of the instrument can incorporate vents for escape of heat from the interior of the instrument during cooling of the paint sample in accordance with embodiments of the invention. The vents will be fitted with filters to remove any fumes in the vented atmosphere.

Figure 2:
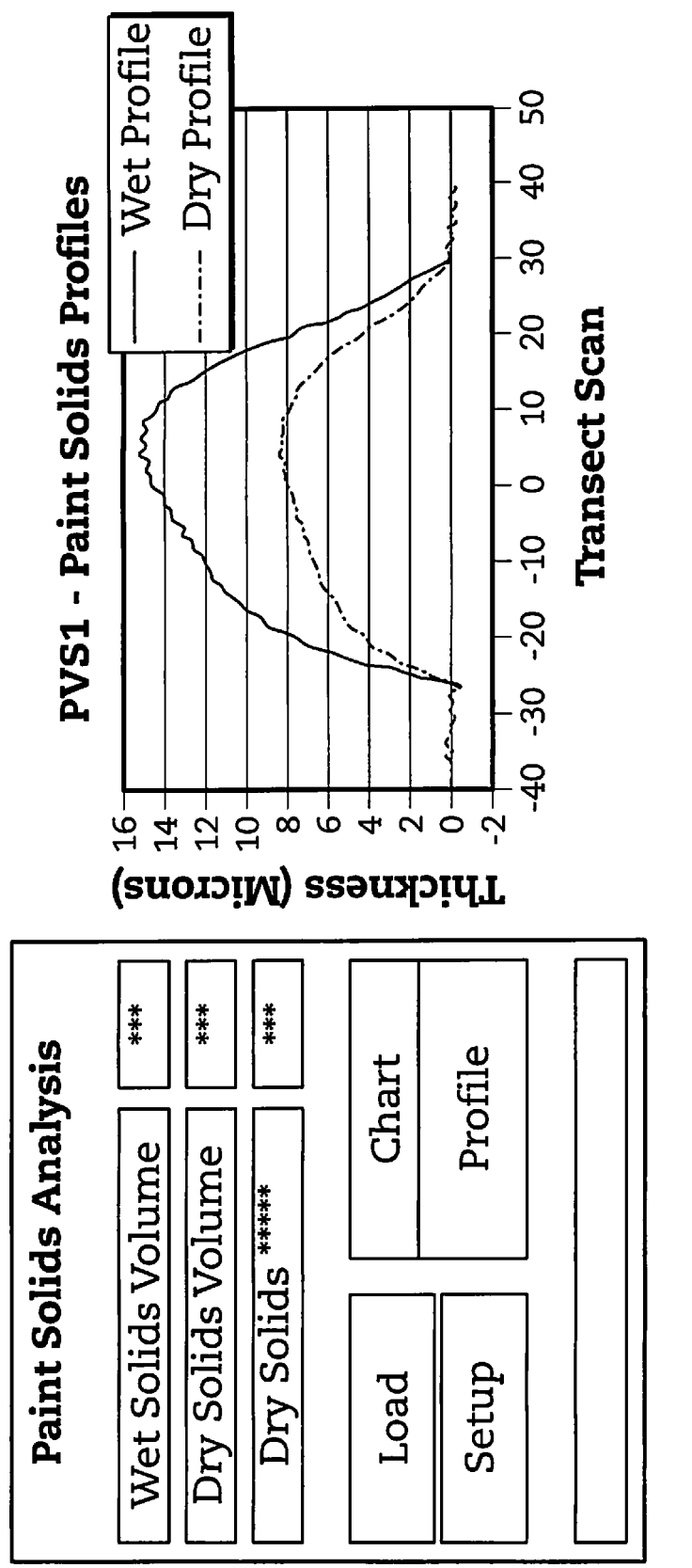
FIG. 2 is a representation of a user interface showing a graph showing measured volume solids of a paint.

An example of a graph showing the determination of the solids volume of paint based on measurement of the wet paint sample smoothed along or across a suitable substrate by spreading means (e.g., a doctor blade or mini Meyer bar) is illustrated in FIG. 2. The processing means for processing the data from the sensor will generally comprise a computer with software designed to provide the mathematical calculations from which paint sample average thickness or cross sectional area are derived. Determination of these values is readily achieved using reference surface data by simple formula. For example, coating thickness equals the average height of the paint sample surface minus the average height of the reference surface. Cross sectional area equals the average height multiplied by the distance along which the height has been measured.

A production coating run involves the coating of strip/substrate with a fixed surface area. The surface area of the strip is known or can otherwise by readily calculated (e.g., substrate width×line speed×time). The target dry coating thickness is also known and the volume solids of the selected paint sample can be determined in accordance with a method embodied by the invention. As such, the theoretical volume of the paint required to coat the product substrate can be readily calculated. Paint needed equals the surface area to be coated times the thickness of the dry paint to be applied divided by the paint volume solids (the PVS is expressed as a percentage here). This enables both the volume of the paint required to coat the substrate in a production run to be determined as well as the rate the paint is utilized in the production run; the latter could be displayed during the production painting process. This data can be displayed either in terms of the volume of paint remaining and/or the rate at which it is utilized, and facilitates refilling of the paint holding tank to maintain an adequate amount of the paint for the production run.

Moreover, with knowledge of the volume solids of the paint (or other paint sample) applied to a substrate in a painting process, the final thickness of the paint sample when dry can be calculated based on the determined thickness of the paint when wet.

Typically, the level of sturdiness and vibration retardation with regard to the mounting of a displacement sensor in an instrument embodied by the invention is such that only about 1 µM or less, and more preferably less than about 0.2 µM, of movement of the, or each, displacement sensor occurs in the position of the sensor(s) during the measurement of the surface of the wet or dry paint sample and the surface of the substrate by the sensor(s).

Respective of the displacement sensors used in a method or instrument embodied by the invention can independently be any non-contact such sensor deemed suitable and employ continuous or pulsed electromagnetic waves within or outside the visible spectrum (e.g., visible light or infra-red wavelength) to provide data indicative of the position of the paint when wet and when dried as well as the position of the substrate on which the wet paint sample is placed and smoothed.

Typically, the sensor is one that emits and detects reflected electromagnetic signals, and transmits generated data indicative of the position of the surface of paint sample and/or surface of the substrate to processing means in the form of a suitable analyzer. The Micro Epsilon ILS 2200 or 1700 is a suitable sensor for this purpose.

A displacement sensor used in an embodiment of the invention can be selected from, but not limited to, laser displacement sensors, confocal chromatic displacement sensors or any other non contact distance sensor deemed suitable.

Measurement of the positions of the surface of the wet paint sample and the surface of the substrate are generally made at sensor frequencies of at least 1 kHz or greater, more usually at least about 2.5 kHz, 5 kHz or 10 kHz. Typically, a displacement sensor employed in a method or instrument embodied by the invention will measure the distance to the surface of the wet or dry paint sample and/or the surface of the substrate as described herein to within a tolerance of ±1 µM and more usually, to with a resolution of less than ±0.1 µM.

Figure 3:
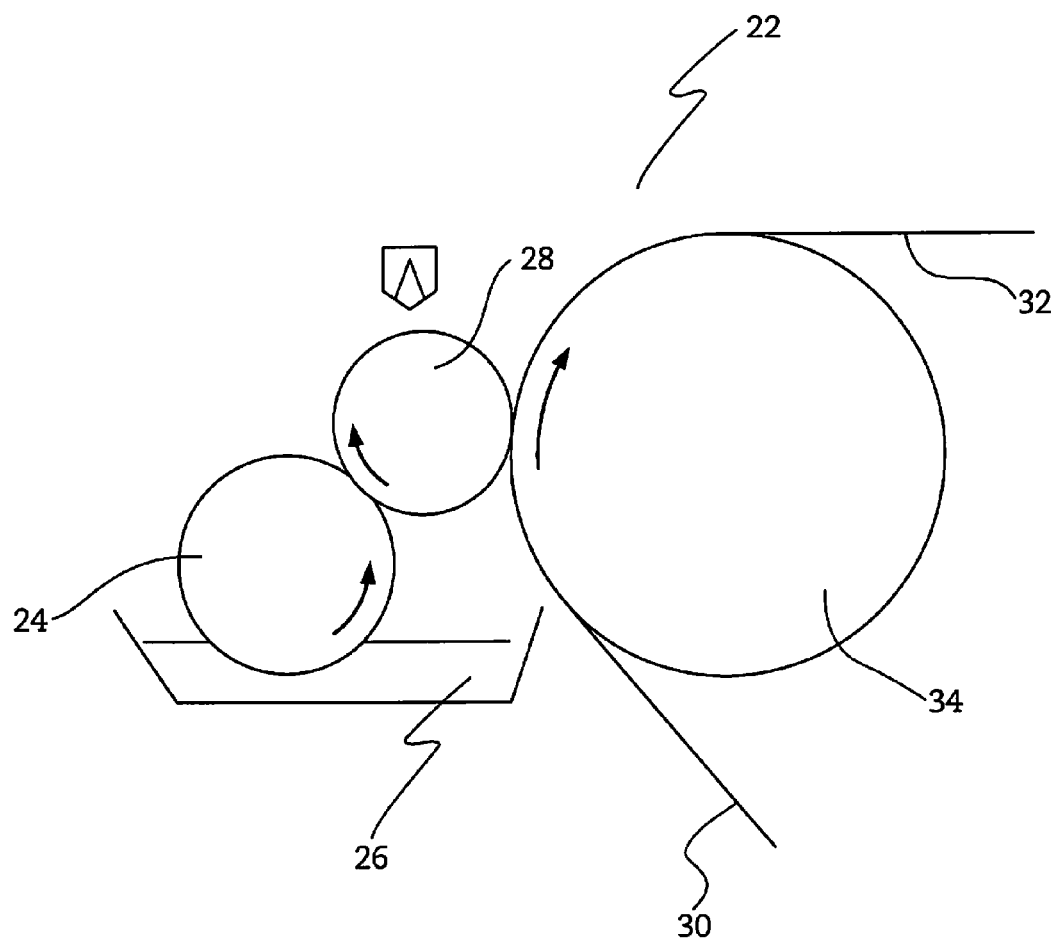
FIG. 3 is a schematic diagram illustrating a roll paint sample applicator for applying paint to a product substrate.

Apparatus for applying and controlling wet paint film thickness applied to a substrate such as sheet steel strip is described below with reference to FIG. 3 which shows a roll paint applicator (22). The roll applicator (22) comprises a precision metal paint pick up roll (24) (also known as a metering roll) arranged to pick up paint from a paint tray (26) and transfer the paint to a counter rotating coating roll (28) having an outer paint sample/contact surface formed of polyurethane rubber (or other suitable plastics or elastomeric material). The paint sample roll (28) applies the paint to the substrate being coated, in this instance essentially flat steel strip (30) with a zinc-aluminium protective paint sample to produce a coated strip (32). The steel strip is unrolled from a pre-coiled roll of the strip (not shown) and fed around a support roll (34) under tension to provide essentially constant positioning of the strip (30) for application of the paint to the strip by the coating roll.

To apply the paint, the paint applicator is typically moved to bring the coating roll (28) into contact with the moving steel strip. There are many configurations of roll paint applicators using different arrangements of rolls and the paint can be applied to the substrate using any such arrangements. Further, the adjustment(s) needed to alter the wet paint sample thickness of such roll paint applicators are known in the art. For example, reducing the contact pressure between the coating roll (28) and the pick-up roll (24) will result in a higher film thickness, as will increasing or decreasing the rotational velocities of the pick-up roll (24) and the coating roll respectively (28) relative to one another. The paint (or other coating) applied to the product substrate can be dried, set or cured during the coating process by passing the coated section of the steel strip through a UV or electron beam curing station, or a drying furnace or oven that is located downstream from the roll applicator on the production line.

While in the embodiment shown a paint tray is provided, any suitable method for providing the paint to the pick-up roll (24) can be utilized. The thickness of the wet paint on the coating roll (28) or pick up roll (24) can be adjusted to provide the target dry paint thickness on the substrate. The target wet paint thickness can be determined by dividing the target dry paint thickness by the volume of the solids (e.g., on a percentage basis) as described herein.

Although a number of embodiments have been described, it will be appreciated by persons skilled in the art that numerous variations and/or modifications may be made without departing from the spirit or scope of the invention as broadly described. The present embodiments are, therefore, to be considered in all respects as illustrative and not restrictive.

The invention claimed is:

1. An instrument to measure the volume solids of a paint sample, the instrument comprising:
sensor means arranged to scan both the surface of a paint sample on a substrate surface moving with respect to the sensor means and an exposed reference surface of the substrate along the same line during the same scan, and to emit and detect signals reflected from the surface of the paint sample and the exposed reference surface of the substrate along the line for generating data sets including data indicative of a position of the surface of the paint sample when wet and a second position of the paint sample when dry, and to detect the position of the exposed reference surface of the substrate, in which the scan line of the paint sample and the exposed reference surface of the substrate when wet is in the same location as the scan line of the paint sample and the exposed reference surface of the substrate when dry, the sensor means being located so as to be distanced from the paint sample for the emission and detection of the signals; and
processing means for processing the data sets generated by the sensor means to determine the volume solids of the paint sample.

2. The instrument according to claim 1 comprising means measuring the position of at least the surface of the paint sample when wet and when dry with relative movement between the sensor means and the paint sample, the relative movement being effectively carried out by a traversing stage to scan the paint sample, and such that the relative movement creates a scan speed during scanning of the paint sample.

3. The instrument according to claim 2 wherein the traversing stage does not impart movement of greater than 10 micrometers to the paint sample in a direction that is perpendicular to a direction of travel, such movement being typical of vibration.

4. The instrument according to claim 1 wherein the exposed reference surface of the substrate comprises a portion of the surface of the substrate on which the paint sample is not placed.

5. The instrument according to claim 2 wherein the exposed reference surface of the substrate is used when scanning the wet paint sample and the dry paint sample.

6. The instrument according to claim 2 wherein the scan speed is substantially the same during scanning of the wet paint sample and scanning of the dry paint sample.

7. The instrument according to claim 1 further comprising spreading means for spreading the paint sample on a surface of the substrate, the sensor means being arranged to detect signals reflected from the surface of the paint sample after spreading for the generation of the data sets.

8. The instrument according to claim 7 in which the spreading means comprises one of a doctor blade and a wire wound draw down bar, the spreading means being adapted to reduce the thickness of the wet paint sample to an average value of between 10 micrometers and 350 micrometers.

9. The instrument according to claim 7 in which the spreading means is adapted to spread the wet paint sample to a width of between 1 mm and 30 mm.

10. The instrument according to claim 1 further comprising drying means for drying the wet paint sample after measurement of the first position of the surface of the wet paint sample wherein the drying means is controlled to heat the substrate and the paint sample to a peak surface temperature value with an accuracy of plus or minus 4 degrees C. from a desired reference temperature.

11. The instrument according to claim 10 further comprising a cooling means to cool the substrate after drying to a selected temperature, the selected temperature being in the range 20 degrees C. to 120 degrees C., and optionally compensating for thermal expansion of the dried paint sample when measuring the position of the surface of the dry paint sample.

12. The instrument according to claim 1 wherein the sensor means comprises a laser displacement sensor for measuring the distance to at least one of the surface of the paint sample and the exposed reference surface of the substrate.

13. The instrument according to claim 1 comprising data indicating average positions of at least the surface of the paint sample when wet and when dry.

14. The instrument according to claim 1 wherein the data sets comprise data indicating average cross sectional area of the paint sample when wet and when dry.

15. The instrument according to claim 1 wherein the data sets comprise data indicating average volume of the paint sample when wet and when dry.

16. The instrument according to claim 1 further comprising processing means wherein a computer with software derives values from the data sets corresponding to the position of the exposed reference surface of the substrate in order to determine one of the average thickness of the paint sample or the cross-sectional area of the paint sample prior to determining the paint volume solids of the paint sample.

17. An instrument according to claim 1 adapted to measure the paint volume solids of a paint sample and to calculate the total volume of paint required to paint a given area of a product at a specified thickness using the measured value of paint volume solids.

18. An instrument according to claim 1 wherein the sensor means arranged to scan the surface of a paint sample on substrate surface moving with respect to the sensor means is arranged so that the substrate surface does not deviate from a flat plane by more than 40 micrometers.

19. A method for measuring volume solids of a paint sample, the method comprising:
   providing a drying means to fully dry a paint sample;
   providing sensor means to emit and detect signals reflected from the surface of the paint sample on a substrate along a line, for generating data sets consisting of data indicative of a position of the surface of the paint sample when wet and when dry and a position of at least one exposed reference surface of the substrate, in which the scan line of the at least one exposed reference surface of the substrate and the paint sample when wet is in the same location as the scan line of the same at least one exposed reference surface and paint sample when dry;
   while the substrate is moving with respect to the sensor using the sensor means to scan along the line to scan both the paint sample and the exposed reference surface to generate the data set for the paint sample when wet;
   drying the paint sample using the drying means;
   while the substrate is moving with respect to the sensor using the sensor means to scan along the line to scan both the paint sample and the exposed reference surface to generate the data set for the paint sample when dry, the sensor means being distanced from the paint sample to emit and detect the signals; and
   processing the data sets to determine the volume solids of the paint sample.

* * * * *